(12) United States Patent
Rennó

(10) Patent No.: US 10,621,865 B2
(45) Date of Patent: Apr. 14, 2020

(54) ROAD CONDITION MONITORING SYSTEM

(71) Applicant: The Regents of The University of Michigan, Ann Arbor, MI (US)

(72) Inventor: Nilton O. Rennó, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 15/939,579

(22) Filed: Mar. 29, 2018

(65) Prior Publication Data
US 2019/0304301 A1 Oct. 3, 2019

(51) Int. Cl.
G01J 1/42 (2006.01)
G08G 1/0967 (2006.01)
G01J 1/04 (2006.01)

(52) U.S. Cl.
CPC .......... G08G 1/0967 (2013.01); G01J 1/0488 (2013.01); G01J 1/42 (2013.01)

(58) Field of Classification Search
CPC ......... G08G 1/0967; G01J 1/0488; G01J 1/42
USPC ........................................................ 340/905
See application file for complete search history.

(56) References Cited

U.S. PATENT DOCUMENTS

| | | |
|---|---|---|
| 3,767,915 A | 10/1973 | Battist |
| 3,970,428 A | 7/1976 | Barringer |
| 4,054,255 A | 10/1977 | Magenheim |
| 4,221,482 A | 9/1980 | Macourt |
| 4,274,091 A | 6/1981 | Decker |
| 4,441,363 A | 4/1984 | Hill et al. |
| 4,463,252 A | 7/1984 | Brennan et al. |
| 4,804,849 A | 2/1989 | Booth et al. |

(Continued)

FOREIGN PATENT DOCUMENTS

| | | |
|---|---|---|
| EP | 0537206 B1 | 1/1996 |
| EP | 1401707 A1 | 3/2004 |

(Continued)

OTHER PUBLICATIONS

Nakauchi, S., K Nishino, T. Yamashita, "Selection of Optimal Combinations of Band-Pass Filters for Ice Detection by Hyperspectral Imaging," Opt. Express 20, 986-1000 (2012).

(Continued)

*Primary Examiner* — Kam Wan Ma
(74) *Attorney, Agent, or Firm* — Harness, Dickey & Pierce, P.L.C.

(57) ABSTRACT

A road condition monitoring system capable of measuring the radiance reflected by an area of interest or the thermal radiance emitted by an area of interest in wavelengths range containing a crossover point between the curves representing the absorption of electromagnetic radiation by ice and water. A detector configured to measure the radiance in a first band having wavelengths in a spectral band on a first side of the crossover point and output a first band signal, and measure the radiance in a second band having wavelengths in a spectral band on a second opposing side of the crossover point and output a second band signal. A data processing unit configured to determine the ratio of the first band signal to the second band signal and compare the ratio to predetermined critical ratios to output a determination signal indicating the presence of water or various types of ice.

13 Claims, 3 Drawing Sheets

(56) References Cited

U.S. PATENT DOCUMENTS

| | | | |
|---|---|---|---|
| 4,809,197 A | 2/1989 | Tashiro et al. | |
| 4,819,480 A | 4/1989 | Sabin | |
| 4,920,263 A | 4/1990 | Fimian et al. | |
| 4,965,573 A | 10/1990 | Gallagher et al. | |
| 4,984,163 A | 1/1991 | Kuwana et al. | |
| 5,005,015 A | 4/1991 | Dehn et al. | |
| 5,028,929 A | 7/1991 | Sand et al. | |
| 5,035,472 A | 7/1991 | Hansen | |
| 5,124,914 A | 6/1992 | Grangeat | |
| 5,218,206 A | 6/1993 | Schmitt et al. | |
| 5,301,905 A | 4/1994 | Blaha | |
| 5,313,202 A | 5/1994 | Hansman, Jr. et al. | |
| 5,497,100 A | 3/1996 | Reiser et al. | |
| 5,521,594 A | 5/1996 | Fukushima | |
| 5,596,320 A | 1/1997 | Barnes | |
| 5,695,155 A | 12/1997 | Macdonald et al. | |
| 5,796,344 A | 8/1998 | Mann et al. | |
| 5,818,339 A | 10/1998 | Giles et al. | |
| 5,905,570 A | 5/1999 | White et al. | |
| 6,040,916 A * | 3/2000 | Griesinger | B60T 8/172 340/905 |
| 6,091,335 A | 7/2000 | Breda et al. | |
| 6,161,075 A | 12/2000 | Cohen | |
| 6,166,645 A | 12/2000 | Blaney | |
| 6,166,657 A | 12/2000 | Mann | |
| 6,269,320 B1 | 7/2001 | Otto | |
| 6,384,611 B1 | 5/2002 | Wallace et al. | |
| 6,430,996 B1 | 8/2002 | Anderson et al. | |
| 6,459,083 B1 | 10/2002 | Finkele et al. | |
| 6,819,265 B2 | 11/2004 | Jamieson et al. | |
| 6,921,898 B1 | 7/2005 | Chen | |
| 6,977,597 B2 | 12/2005 | Doherty | |
| 7,100,427 B2 | 9/2006 | Kahn et al. | |
| 7,104,502 B2 | 9/2006 | Otto et al. | |
| 7,119,891 B2 | 10/2006 | White et al. | |
| 7,224,453 B2 | 5/2007 | Elman | |
| 7,265,846 B2 | 9/2007 | Forsyth | |
| 7,301,478 B1 | 11/2007 | Chinn et al. | |
| 7,370,525 B1 | 5/2008 | Zhao et al. | |
| 7,424,399 B2 | 9/2008 | Kahn et al. | |
| 7,796,833 B2 | 9/2010 | Polonskiy et al. | |
| 7,839,301 B2 | 11/2010 | Doherty et al. | |
| 7,986,408 B2 | 7/2011 | Ray et al. | |
| 8,000,847 B2 | 8/2011 | Shue | |
| 8,044,823 B2 | 10/2011 | Doherty et al. | |
| 8,325,338 B1 * | 12/2012 | Pope | G01J 3/0291 340/962 |
| 8,350,910 B2 | 1/2013 | Capello et al. | |
| 8,666,570 B1 | 3/2014 | Tillotson | |
| 8,711,008 B2 | 4/2014 | Cook et al. | |
| 8,796,627 B2 | 8/2014 | Rockwell et al. | |
| 8,854,464 B2 | 10/2014 | Ishi et al. | |
| 9,013,332 B2 | 4/2015 | Meis | |
| 9,041,926 B2 | 5/2015 | Ray et al. | |
| 9,297,755 B2 | 3/2016 | Renno | |
| 9,302,777 B2 | 4/2016 | Renno | |
| 9,304,081 B2 | 4/2016 | Renno | |
| 9,305,220 B2 | 4/2016 | Funayama et al. | |
| 2002/0162962 A1 | 11/2002 | Rudolph | |
| 2003/0150992 A1 | 8/2003 | Chavez et al. | |
| 2003/0169186 A1 | 9/2003 | Vopat | |
| 2004/0036630 A1 | 2/2004 | Jamieson et al. | |
| 2004/0206854 A1 | 10/2004 | Shah et al. | |
| 2004/0231410 A1 | 11/2004 | Bernard et al. | |
| 2005/0002435 A1 | 1/2005 | Hashimoto et al. | |
| 2005/0100336 A1 | 5/2005 | Mendenhall et al. | |
| 2005/0105103 A1 | 5/2005 | Schietinger et al. | |
| 2005/0151965 A1 | 7/2005 | Bissett et al. | |
| 2005/0167593 A1 * | 8/2005 | Forsyth | G01N 21/314 250/339.11 |
| 2005/0218268 A1 | 10/2005 | Otto et al. | |
| 2005/0230553 A1 | 10/2005 | Otto et al. | |
| 2006/0050270 A1 | 3/2006 | Elman | |
| 2006/0261975 A1 | 11/2006 | Fridthjof | |
| 2007/0074415 A1 | 4/2007 | Gagnon | |
| 2008/0110254 A1 | 5/2008 | Zhao et al. | |
| 2008/0129541 A1 * | 6/2008 | Lu | G06K 9/00791 340/905 |
| 2008/0161878 A1 | 7/2008 | Tehrani et al. | |
| 2008/0218385 A1 | 9/2008 | Cook et al. | |
| 2009/0222238 A1 | 9/2009 | Gagnon | |
| 2009/0261811 A1 | 10/2009 | Gordon | |
| 2010/0072367 A1 | 3/2010 | Meurer | |
| 2010/0085175 A1 | 4/2010 | Fridthjof | |
| 2010/0110431 A1 | 5/2010 | Ray et al. | |
| 2010/0131203 A1 | 5/2010 | Lilie et al. | |
| 2011/0019188 A1 | 1/2011 | Ray et al. | |
| 2011/0135197 A1 | 6/2011 | Paris et al. | |
| 2011/0213554 A1 | 9/2011 | Archibald et al. | |
| 2012/0085868 A1 | 4/2012 | Barnes | |
| 2012/0123637 A1 | 5/2012 | Funayama et al. | |
| 2012/0140233 A1 | 6/2012 | Rockwell et al. | |
| 2012/0182544 A1 | 7/2012 | Asahara et al. | |
| 2012/0187301 A1 | 7/2012 | Markson | |
| 2012/0191350 A1 | 7/2012 | Prata et al. | |
| 2012/0193477 A1 | 8/2012 | Thorez et al. | |
| 2012/0266669 A1 | 10/2012 | Sage | |
| 2012/0274938 A1 | 11/2012 | Ray | |
| 2012/0327410 A1 * | 12/2012 | Maston | G01J 3/0264 356/307 |
| 2013/0008174 A1 | 1/2013 | Gould et al. | |
| 2013/0234884 A1 | 9/2013 | Bunch et al. | |
| 2013/0249701 A1 * | 9/2013 | Zhang | H01R 13/717 340/686.6 |
| 2014/0081507 A1 | 3/2014 | Urmson et al. | |
| 2014/0112537 A1 | 4/2014 | Frank et al. | |
| 2014/0347189 A1 * | 11/2014 | Weksler | H04M 1/72563 340/687 |
| 2014/0372069 A1 | 12/2014 | Nuzzio | |
| 2015/0019185 A1 | 1/2015 | Cunningham et al. | |
| 2015/0120092 A1 * | 4/2015 | Renno | B64D 15/20 701/3 |
| 2015/0120093 A1 * | 4/2015 | Renno | G01N 21/3554 701/3 |
| 2015/0170485 A1 * | 6/2015 | DeCusatis | G06K 7/10158 340/10.42 |
| 2017/0197728 A1 | 7/2017 | Renno | |
| 2018/0056854 A1 | 3/2018 | Kunii et al. | |

FOREIGN PATENT DOCUMENTS

| | | |
|---|---|---|
| EP | 2637045 A2 | 9/2013 |
| JP | 2001-099710 A | 4/2001 |
| JP | 2006046936 A | 2/2006 |
| JP | 2009115498 A | 5/2009 |
| JP | 4492883 B2 | 6/2010 |
| WO | 2014132073 A1 | 9/2014 |
| WO | 2015116873 A2 | 8/2015 |
| WO | 2016000666 A1 | 1/2016 |

OTHER PUBLICATIONS

Gregoris, D., S. Yu, and F. Teti, "Multispectral Imaging of Ice," Paper Presented at the Canadian Conference on Electrical nd Computer Engineering, 4, 2051-2056.

Jonsson, P, Remote Sensor for Winter Road Surface Status Detection. In: Proceedings of IEEE Sensors (2011) p. 1285-8.

Kou, L., Labile, D., and Chylek, P., "Refractive indices of water and ice in the 0.65- to 2.5μm spectral range", (Jul. 1993), Appl. Opt., 32(19), 3531-3540.

Vanderlei Martins, J., et al., "Remote sensing the vertical profile of cloud droplet effective radius, thermodynamic phase, and temperature", (Mar. 2007), Atmos. Chem. Phys. Discuss., 7, 4481-4519.

Rennó, N. O., et al., "CHASER: An Innovative Satellite Mission Concept to Measure the Effects of Aerosols on Clouds and Climate", (May 2013), Bull. Amer. Meteor. Soc., 94, 685-694.

International Search Report and Written Opinion, International Application No. PCT/US2014/038003, dated Aug. 14, 2014, 13 pages.

International Search Report and Written Opinion, International Application No. PCT/US2014/047415, dated Nov. 20, 2014, 12 pages.

(56) References Cited

OTHER PUBLICATIONS

Zahorowski et al., Vertical Radon-222 Profiles in the Atmospheric Boundary Layer, CAWCR 5th Annual Workshop, Atmospheric Composition Observations and Modelling and the Cape Grim Annual Science Meeting, Nov. 15-17, 2011, Bureau of Meteorology, Melbourne, Australia.

Turekian et al., Geochemistry of Atmospheric Radon and Radon Products, Annual Review of Earth and Planetary Sciences, 1977, vol. 5, pp. 227-255.

Jacob and Prather, Radon-222 as a Test of Convective Transport in a General Circulation Model, Tellus (1990), 42B, pp. 118-134.

Mason, Engine Power Loss in Ice Crystal Conditions, Aero Quarterly, 2007.

Guffanti et al., Encounters of Aircraft with Volcanic Ash Clouds: a Compilation of Known Incidents, 1953-2009, U.S. Department of the Interior, U.S. Geological Survey, Data Series 545, Version 1.0, 2010, Reston, Virginia, U.S.A.

Li et. al., A Three-Dimensional Global Episodic Tracer Transport Model: 1. Evaluation of its Transport Processes by Radon 222 Simulations, Journal of Geophysical Research, vol. 101, No. D20, pp. 25,931-25,947, Nov. 20, 1996.

Kritz et al., Radon Measurements in the Lower Tropical Stratosphere: Evidence for Rapid Vertical Transport and Dehydration of Tropospheric Air, Journal of Geophysical Research, vol. 98, No. D5, pp. 8725-8736, May 20, 1993.

Lambert et al., Volcanic Output of Long-Lived Radon Daughters, Journal of Geophysical Research, vol. 87, No. C13, pp. 11,103-11,108, Dec. 20, 1982.

Schery, An Estimate of the Global Distribution of Radon Emissions from the Ocean, Geophysical Research Letters, vol. 31, Oct. 7, 2004.

Williams et al., The Vertical Distribution of Radon in Clear and Cloudy Daytime Terrestial Boundary Layers, Journey of Atmospheric Sciences, vol. 68, pp. 155-174, Jan. 2011.

Moore et al., 222Rn, 210 Pb, 210Bi, and 210Po Profiles and Aerosol Residence Times Versus Altitude, Journal of Geophysical Research, vol. 78, No. 30, Oct. 20, 1973.

Martins et. al., Remote Sensing the Vertical Profile of Cloud Droplet Effective Radius, Thermodynamic Phase, and Temperature, Atmospheric Chemistry and Physics Discussions, 7, 4481-4519, 2007.

Kendra, J. R., Ulaby, F. T., & Sarabandi, K. (1994). Snow probe for in situ determination of wetness and density. Geoscience and Remote Sensing, IEEE Transactions on Geoscience and Remote Sensing, 32 (6), 1152-1159.

Sarabandi, K., & Li, E. S. (1997). Microstrip ring resonator for soil moisture measurements. Geoscience and Remote Sensing, IEEE Transactions on Geoscience and Remote Sensing, 35 (5), 1223-1231.

Dionigi, M., Ocera, A., Fratticcioli, E., and Sorrentino, R. (2004), A new resonant probe for Dielectric permittivity measurement, European Micro. Conf. Dig., Amsterdam, 673-676.

Fratticcioli, E., M. Dionigi, and R. Sorrentino (2004), "A simple and low-cost measurement system for the complex permittivity characterization of materials," IEEE Trans. on Instrumentation and Measurement, 53(4), 1071-1077.

Sagnard, F. and Y.-L. Beck (2009), "Experimental study of the influence of moisture and dry density on a silt soil using a monopole probe," Micro and Optical Tech. Lett., 51(3), 820-826.

Chang, K., & Hsieh, L H. (2004), Microwave Ring Circuits and Related Structures, Second Edition, John Wiley & Sons, Inc.

International Search Report and Written Opinion, International Application No. PCT/US2014/061949, dated Feb. 9, 2015, 9 pages.

International Search Report and Written Opinion of the International Searching Authority dated Apr. 21, 2017 regarding PCT/US2017/012410.

International Search Report and Written Opinion of the International Searching Authority dated Jul. 9, 2019 regarding PCT/US2019/023960.

\* cited by examiner

Fig-5

Operational Runway Condition Assessment Matrix (RCAM) Braking Action Codes and Definitions

| Assessment Criteria | | Control/Braking Assessment Criteria | |
|---|---|---|---|
| Runway Condition Description | RwyCC | Deceleration or Directional Control Observation | Pilot Reported Braking Action |
| • Dry | 6 | -- | -- |
| • Frost<br>• Wet (Includes Damp and 1/8-inch Depth or Less of Water)<br>1/8-inch (3mm) Depth or Less of:<br>• Slush<br>• Dry Snow<br>• Wet Snow | 5 | Braking Deceleration is Normal for the Wheel Braking Effort Applied AND Directional Control is Normal | Good |
| -15°C and Colder Outside Air Temperature:<br>• Compacted Snow | 4 | Braking Deceleration OR Directional Control is Between Good and Medium | Good to Medium |
| • Slippery When Wet (Wet Runway)<br>• Dry Snow or Wet Snow (Any Depth) Over Compacted Snow Greater Than 1/8-inch (3mm) Depth of:<br>• Dry Snow<br>• Wet Snow<br>Warmer Than -15 C Outside Air Temperature:<br>• Compacted Snow | 3 | Braking Deceleration is Noticeably Reduced for the Wheel Braking Effort Applied OR Directional Control is Noticeably Reduced | Medium |
| Greater Than 1/8-inch (3mm) Depth of:<br>• Water<br>• Slush | 2 | Braking Deceleration OR Directional Control is Between Medium and Poor | Medium to Poor |
| • Ice | 1 | Braking Deceleration is Significantly Reduced for the Wheel Braking Effort Applied OR Directional Control is Significantly Reduced | Poor |
| • Wet Ice<br>• Slush Over Ice<br>• Water Over Compacted Snow<br>• Dry Snow or Wet Snow Over Ice | 0 | Braking Deceleration is Minimal to Non-Existant for the Wheel Braking Effort Applied OR Directional Control Uncertain | Nil |

ROAD CONDITION MONITORING SYSTEM

GOVERNMENT INTEREST

This invention was made with government support under IIP-1701057 awarded by the National Science Foundation. The government has certain rights in the invention.

FIELD

The present disclosure relates to a road condition monitoring system configured to detect water, snow, clear ice (also referred to as glaze or black ice), frost and other types of ices on roads or any other surface of interest. This system is configured to distinguish dry surfaces from those covered by water, clear ice, snow, and other types of ice.

BACKGROUND AND SUMMARY

This section provides background information related to the present disclosure which is not necessarily prior art. This section provides a general summary of the disclosure, and is not a comprehensive disclosure of its full scope or all of its features.

Approximately 20% of all car crashes in the United States (nearly 1,250,000 per year) are weather-related. From these crashes, on average, nearly 6,000 people are killed and over 450,000 people are injured.

The principles of the present teachings provides a simple method and apparatus to distinguish road conditions (i.e. wet roads from icy roads) which is used to warn drivers, provide data for automobile traction control system, and provide data for autonomous automobile systems.

Dry roads can be distinguished unambiguously from other road conditions (such as icy roads, wet roads, and snow covered roads) using measurements of the radiance in spectral bands in which the slope of the absorption of electromagnetic radiation by ice is substantially different from that of water. According to the principles of the present teachings, multi-spectral cameras can be used to detect parameters sufficient for surface monitoring, such as but not limited to ice detection on aircraft, manufacturing systems, or other objects of interest.

The present teachings provide a simple method and a device for unambiguously distinguishing dry roads from wet roads and icy roads. The method and device can be used to provide warnings to drivers, to provide information for automobile tracking systems, to provide information for automobile breaking systems, and to provide information for autonomous automobile systems, among other applications.

Dry roads can be distinguished unambiguously from icy roads, wet roads, and roads with layers of snow or water by measurements of the radiance in spectral bands in which the slope of the absorption of electromagnetic radiation by ice is substantially different from that of water.

In some embodiments of the present invention, detectors, detector arrays or multi-spectral cameras can be used to make the required measurements. A similar system can be used for detecting ice or water unambiguously on aircrafts, manufacturing systems, or any other object of interest.

In some embodiments of the present invention, a system is provided that is configured to detect water, snow, frost, clear ice (black or glaze ice), and other types of ices on roads and any other surface of interest. The system is configured to distinguish dry surfaces from those covered by water, snow, frost, and various types of ice even when they cover only a fraction of the field of view of the road condition monitoring system.

The monitoring of road conditions enhances the safety of motor vehicles by providing warnings to the driver, traction control, braking, cruise control, or automation systems. Moreover, the data from the measurements by the road condition monitoring system can be shared with connected vehicles and any other potential users, such as road maintenance departments.

Water and ice can often be difficult to detect by drivers or current synthetic vision systems. Clear ice (black or glaze ice) is unusually difficult to detect. Unfortunately, practical systems capable of reliably detecting ice or water on roads do not exist.

Cars, trucks, trains, automated people movers, rails, monorails, metros, buses, motorcycles, bicycles and other similar vehicles lack suitable systems for detecting the presence of ice or water on surfaces, such as roadways, bridges, railways, sidewalks, or even runway and taxiways (such as in connection with ground operations of aircraft or supporting personal and vehicles).

Ice detection in most vehicles merely includes a simple notification once the air temperature is at or near the freezing point of water. However, unfortunately, temperature is not a reliable indicator of the presence of surface ice that may affect the safety or drivability of a vehicle. The fact that drivers and operators are frequently unaware of the deteriorating road condition ahead of a vehicle frequently leads to accidents.

Some of the prior art approaches for detecting slippery ice on surfaces, such as roads, use an imager capable of measuring the polarization of the light reflected by glaze ice. However, it should be understood that although light is polarized when reflected by dielectric materials, such as glaze ice, glaze ice is not the only dielectric material that polarizes light. In fact, reflections by wet and/or oily surfaces and even smooth asphalt also cause polarization, which would lead to false reporting of the presence of ice. Therefore, polarization measurements are not enough for distinguishing among the possible types of dielectric materials scattering or reflecting light. Consequently, they cannot be used to detect the presence of ice or water unambiguously.

For example, U.S. Pat. No. 2008/0129541A1 refers to a slippery ice warning system capable of monitoring the road ahead of a vehicle. One or two cameras are used to image the same scene at two orthogonal polarizations. When a single camera is used, a polarization beam splitter is used to separate the reflected light into two orthogonal polarizations. The possible (but ambiguous) determination of the existence of slippery ice ahead of the vehicle is detected by measuring the polarization of the reflected light. However, again, this system is unable to discern whether the detected polarization is due to ice or some other reflective material.

Some of the prior art approaches for detecting ice and water on surfaces are also based on infrared radiance measurements. However, these prior art techniques are more complex and less accurate than the method described in the present disclosure.

For example, U.S. Pat. No. 2005/0167593A1 refers to a method that uses shift in the wavelength of the reflectance near 1.4 µm to distinguish water from ice. In this method, liquid water and ice are discriminated from each other by analyzing shifts in the short wavelength edge of the 1.4 µm band reflectance. This requires at least three measurements. The midpoint wavelength of the transition is compared to threshold ranges for ice and liquid water. The midpoint wavelength is mapped using at minimum the values of radiance measurements at three narrow bands near the step. Detection decisions are based on shifts in wavelengths, not the simpler ratio of radiance values of the present teachings.

According to the principles of the present teachings, a water, snow and ice detection system is provided that overcomes the disadvantages of the prior art and is particularly useful for the monitoring of road conditions. In most embodiments of the present teachings, the system detects ice, snow, and water unambiguously by making measurements of radiance. In some embodiments, the system can be passive while in other embodiments a light source can be included, multispectral detectors and/or multispectral camera, a data processor unit, and interfaces with displays, safety systems, and/or autonomous systems to provide an indication of the road condition and a response to it.

The road condition monitoring system of the present teachings can be passive and in one embodiment contains only a detector pair with filters, a data processor unit, and interfaces to displays or control systems.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 illustrates the absorption spectra of water substance and particularly the complex index of refraction of liquid water and ice indicating that radiance measurements around crossover points, such as those marked in the figure (e.g., at approximately 0.38, 1.47, 2.15, 3.0, 6.2, 9.0, and 10.8 µm as non-exhaustive examples), can be used to distinguish a dry surface from those covered by water or ice.

FIG. 5 is a table illustrating the Operation Runway Condition Assessment Matrix for braking action codes and definitions.

Corresponding reference numerals indicate corresponding parts throughout the several views of the drawings.

DETAILED DESCRIPTION

Figure 1:
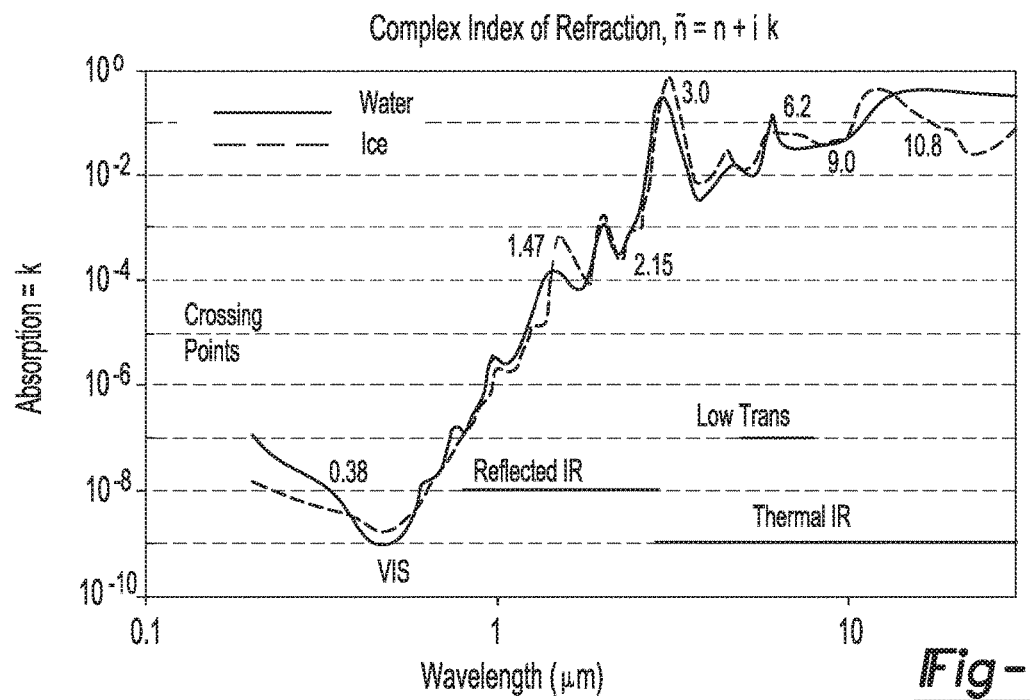

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, operations, elements, and/or components, but do not preclude the presence or addition of one or more other features, operations, elements, components, and/or groups thereof. The processes, and operations described herein are not to be construed as necessarily requiring their performance in the particular order discussed or illustrated, unless specifically identified as an order of performance. It is also to be understood that additional or alternative calculations may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present teachings provide a road condition monitoring system 10 for detecting road condition and/or for surface monitoring ahead of a vehicle, such as but not limited to ice detection on aircraft, manufacturing systems, or other objects of interest. The road condition monitoring system 10 is an optical based system configured to detect water, snow, frost, clear ice (also referred to as glaze or black ice), and other types of ices on roads or any other surface of interest. Road condition monitoring system 10 is configured to distinguish dry surfaces from those covered by water, snow, or other types of ice.

In some embodiments, road condition monitoring system 10 distinguishes dry roads from those covered by water, snow, frost, and various types of ice even when they cover only a fraction of the field of view of the road condition monitoring system. In some embodiments, road condition monitoring system 10 uses measurements of radiance in at least two spectral bands indicated in FIGS. 1 and 2 to estimate the road condition ahead of the vehicle, at distances in excess of 100m.

Radiance measurements (instead of reflectance measurements) are sufficient for most practical applications, because the targets can be illuminated with light sources containing relatively small power variations between the spectral bands of interest (e.g., surfaces illuminated by direct or indirect sunlight, or illuminated by a known light source).

Figure 2:
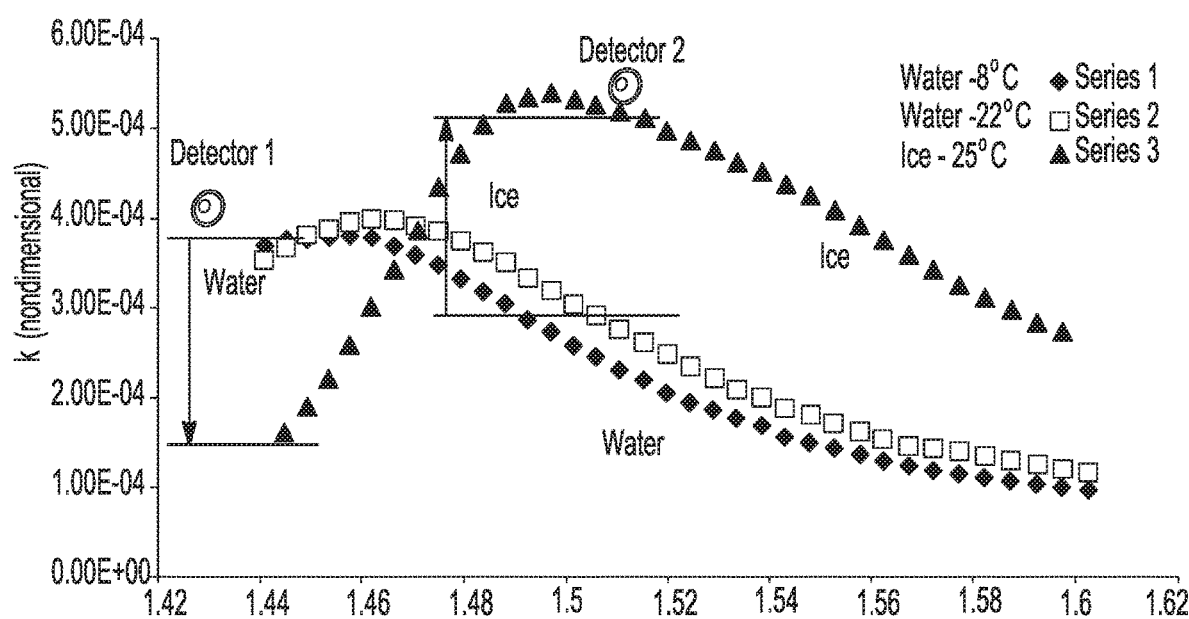
FIG. 2 illustrates the index of refraction of liquid water and ice at the 1.47 µm crossover point.

As illustrated in FIG. 2, a crossover point occurs in the imaginary part of the index of refraction of liquid water and ice at the 1.47 µm. In this band, careful measurements at each side of the crossover point, like in the two bands indicated in the figure by horizontal bars move the detection signal of water in the opposite direction to that of snow and ice. The location and width of the first (detector 1) and second (detector 2) bands are selected such that water causes the first band radiance signal and the second band radiance signal to move in opposite direction than for ice.

Figure 3:
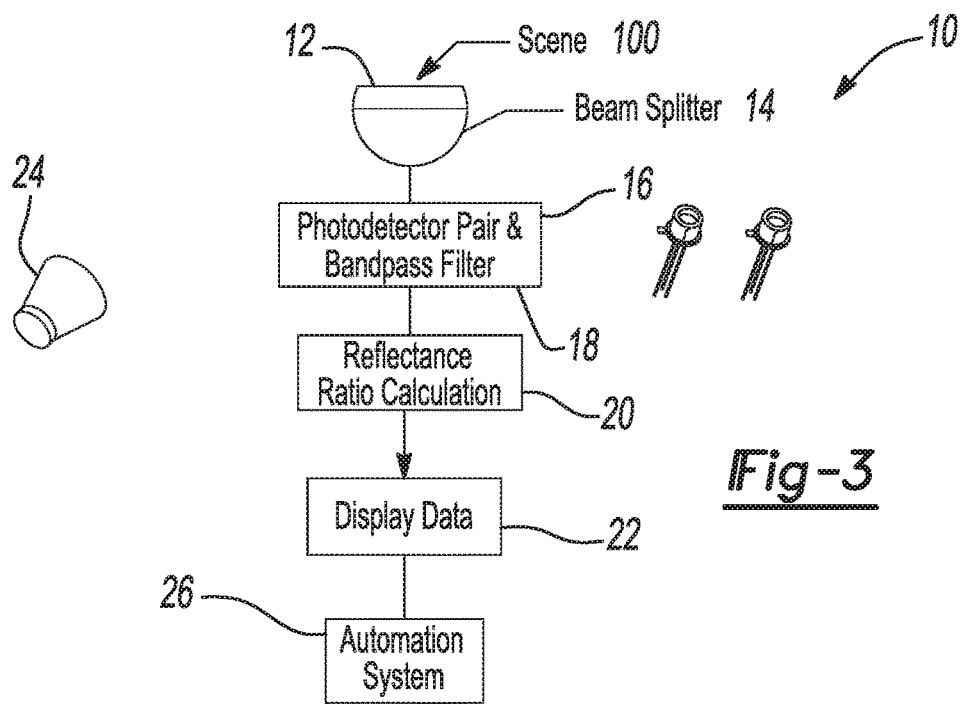
FIG. 3 shows a schematic block diagram illustrating a road condition monitoring system according to the principles of the present teachings.

FIG. 3 shows a schematic block diagram illustrating road condition monitoring system 10 according to the principles of the present teachings. Road condition monitoring system 10 can comprise light collection optics 12, a beam splitter 14, at least one or a pair of photodetectors or detectors 16 with bandpass filters 18 (such as, but not limited to, camera and spectral filters), and a subsystem or data processing unit 20 to calculate the ratio of the radiance in the two bands and output the results to a display, interface, or other output system 22. A light source 24 can be provided that is configured to illuminate a surface of interest 100. As described herein, in some embodiments, the present teachings provide system 10 that alerts the driver or provides feedback to a vehicle's automation systems 26.

Figure 4:
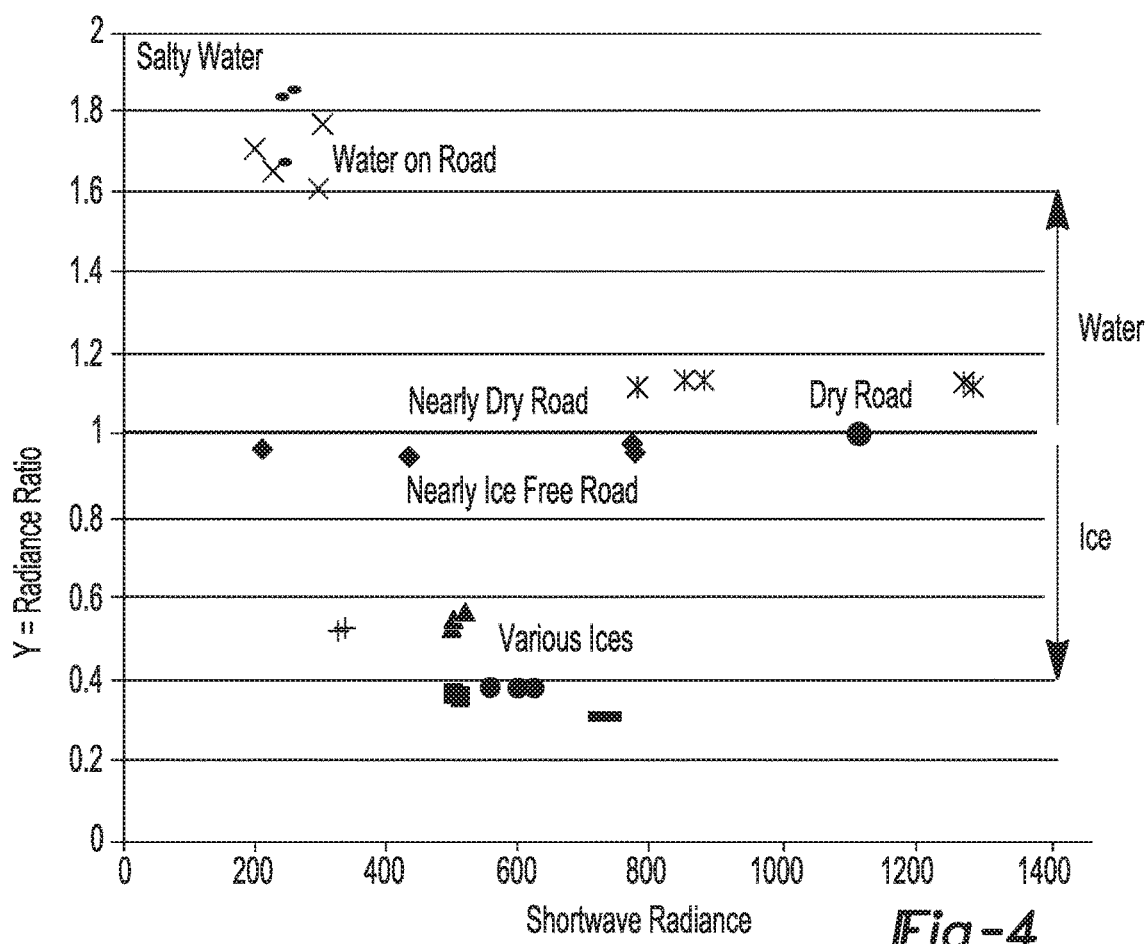
FIG. 4 illustrates radiance ratios derived from measurements of roads covered with water, snow, and various types of ice according to the principles of the present teachings.

FIG. 4 illustrates radiance ratios derived from measurements of roads covered with water, snow, and various types of ice. When the radiance ratio for dry road is set to one, water produces an increase in the radiance ratio, while snow and the various types of ice produces a decrease in the radiance ratio. Nearly dry road, but with small fractional coverage of ice and water produce radiance ration slightly smaller and slightly larger than one.

In some embodiments, the present teachings provide a system that alerts the driver or provides feedback to the vehicle's automation systems. The present system is capable of quantifying the hazards level using road condition assessment matrices analogous to the FAA runway condition assessment matrix shown in FIG. 5.

An algorithm for assessing road condition ahead of a vehicle could comprise the following steps:

1. Measurements with an optical system containing a pair of detectors or a pixel array with spectral filters are used to measure the radiance of the area of interest (e.g. 100m ahead of the vehicle).

2. Measurements with a spectral filter that allows radiance in a first band between about 1.400 and 1.450 µm to pass are used to determine the radiance at one side of the crossover point (R1.425 µm);

3. Measurements with a spectral filter that allows radiance in a second band between about 1.475 and 1.525 µm to pass are used to determine the radiance at the other side of the crossover point (R1.500 µm);

4. The measurements in the first and second band are then used to determine the radiance ratio γ of the area of interest;

5. The value of the radiance ratio γ is used to determine the surface or road condition using a road condition assessment matrix;

6. The surface temperature (T) is estimated using measurements by a thermocouple or any other suitable method;

7. The surface temperature is then used to refine the surface or road condition assessment; and 8. Feedback is provided to the operator or vehicle automation system.

In some embodiments, a WARNING is produced when hazardous conditions are detected.

During the day, sunlight reflected by the area of interest can be used for making the measurements, but in this case the spectral distribution of the incoming solar radiation in the bands on interest also needs to be measured. At night, the area of interest ahead of a vehicle can be illuminated with light sources containing the desired spectrum, or alternatively the measurements can be performed in a thermal band, for example, around 10.8 µm.

In some embodiments, halogen lights, incandescent lights, or infrared lasers or LEDs can be used to illuminate the area of interest while the radiance can be measured with cameras, such as those based on Indium Gallium Arsenide (InGaAs) technology, or with photodetectors, photodiodes, pyroelectric detectors, thermopile detectors, photoconductors, among others. In more complex embodiments, the area of interest miles ahead of the vehicle can be illuminated with intense laser beams containing the desired spectrum. However, this capability is not implemented in the preferred embodiment because the simpler version of the system is sufficient for most applications.

In summary, a road condition monitoring system is provided that is capable of measuring the radiance reflected by an area of interest or the thermal radiance emitted by an area of interest in wavelengths range containing a crossover point between the curves representing the absorption of electromagnetic radiation by ice and water. The detection system measures the radiance in a first band having wavelengths in a spectral band on a first side of the crossover point and outputting a first band signal, and further measures the radiance in a second band having wavelengths in a spectral band on a second opposing side, of the same crossover point and outputting a second band signal. The crossover point and the measurement bands on each side of the crossover point are selected carefully to provide unambiguous detection of water, snow and various types of ice even when these substances cover a fraction of the field of view of the road condition monitoring system. A processing unit determines the ratio of the first band signal to the second band signal, and compares the ratio to predetermined critical ratios to output the determination signal indicating the presence of water or various types of ice.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for detecting the road condition ahead of a vehicle or the condition of a surface of interest, the system comprising:
   at least one detector configured to measure radiance in bands adjacent to a crossover point of the imaginary part of the index of refraction of liquid water and ice, the at least one detector configured to measure the radiance in a first band having wavelengths in a spectral band on a first side of the crossover point and output a first band signal, the at least one detector configured to measure the radiance in a second band having wavelengths in a spectral band on a second opposing side of the crossover point and output a second band signal;
   the location and width of the first and second bands selected based on slopes of the imaginary parts of the indexes of refraction of liquid water and ice between opposing sides of the crossover point such that water causes the first band signal and the second band signal to move in an opposite direction than ice; and
   a data processing unit with software configured to implement an algorithm to detect the presence of water, snow, frost, ice and water/ice mixtures using non-transitory software and look-up tables to estimate the surface condition based on a radiance ratio of the radiance in the first band and the radiance in the second band and output a warning or alert when a predetermined condition is detected based on the radiance measurements in the first band and the second band.

2. The system according to claim 1 wherein the detector comprises a camera and spectral filters.

3. The system according to claim 1 further comprising: a light source configured to illuminate a surface of interest.

4. The system according to claim 1, further comprising: an interface configured to display the warning or alert to an operator.

5. The system according to claim 1, further comprising: an automation system configured to respond to the warning or alert from the data processing unit.

6. The system according to claim 1, further comprising: an interface configured to prevent unsafe vehicle driving configurations in response to the warning or alert.

7. A system for detecting the road condition ahead of a vehicle or the condition of a surface of interest, the system comprising:
   at least one detector configured to measure radiance in bands adjacent to a crossover point of the imaginary part of the index of refraction of liquid water and ice, the at least one detector configured to measure the radiance in a first band having wavelengths in a spectral band on a first side of the crossover point and output a first band signal, the at least one detector configured to measure the radiance in a second band having wavelengths in a spectral band on a second opposing side of the crossover point and output a second band signal;
   the location and width of the first and second bands selected based on slopes of the imaginary parts of the indexes of refraction of liquid water and ice between opposing sides of the crossover point such that water causes the first band signal and the second band signal to move in an opposite direction than ice; and
   a data processing unit configured to determine the ratio of the first band signal to the second band signal and compare the ratio to predetermined critical ratios to output a determination signal indicating the presence of water or various types of ice.

8. The system according to claim 7 wherein the detector comprises a camera and spectral filters.

9. The system according to claim 7 further comprising: a light source configured to illuminate the road.

10. The system according to claim 7, further comprising: an interface configured to display the determination signal to an operator.

11. The system according to claim 7, further comprising: an automation system configured to respond to the determination signal from the data processing unit.

12. The system according to claim 7, further comprising: an interface configured to prevent unsafe vehicle driving configurations in response to the determination signal.

13. A method for detecting the road condition ahead of a vehicle or the condition of a surface of interest, comprising:
   measuring radiance in a first band and a second band adjacent to a crossover point of the imaginary part of the index of refraction of liquid water and ice and outputting a first band signal and a second band signal respectively, the radiance in the first band having wavelengths in a spectral band on a first side of the crossover point and in the second band having wavelengths in a spectral band on a second opposing side of the crossover point;
   adjusting the location and width of the first band and the second band based on slopes of the imaginary parts of the indexes of refraction of liquid water and ice between opposing sides of the crossover point such that water pushes the first band signal and the second band signal in the opposite direction than ice; and
   determining the ratio of the first band signal to the second band signal and comparing the ratio to predetermined critical ratios to output a determination signal indicating the presence of water or ice.

* * * * *